L. JAENICHEN.
PENDULUM SCALE.
APPLICATION FILED FEB. 26, 1914.
1,116,590.
Patented Nov. 10, 1914.
5 SHEETS—SHEET 1.
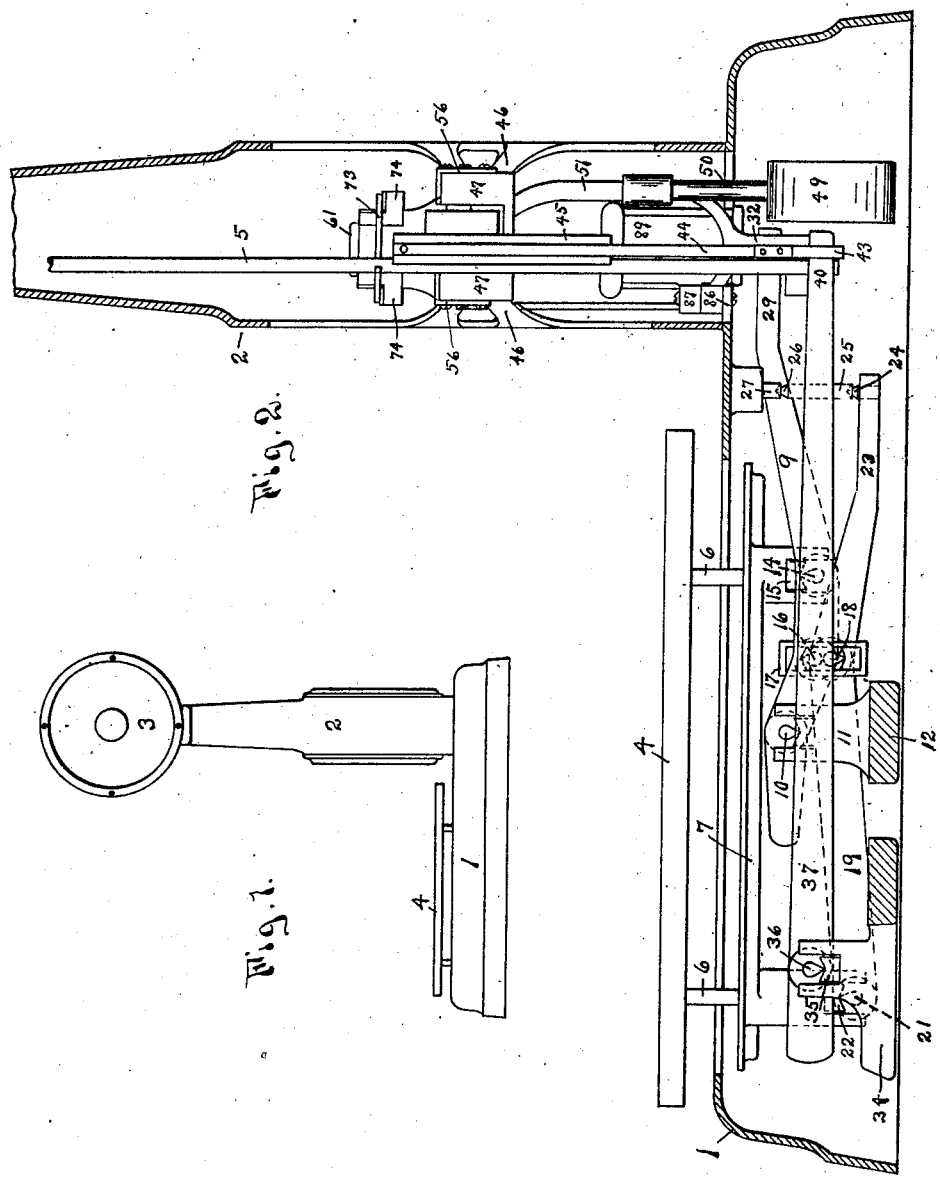
WITNESSES:
L. S. Woodhull
Hugo W. Kreinbring
INVENTOR
Louis Jaenichen.
BY
Edward N. Pagelsen,
ATTORNEY

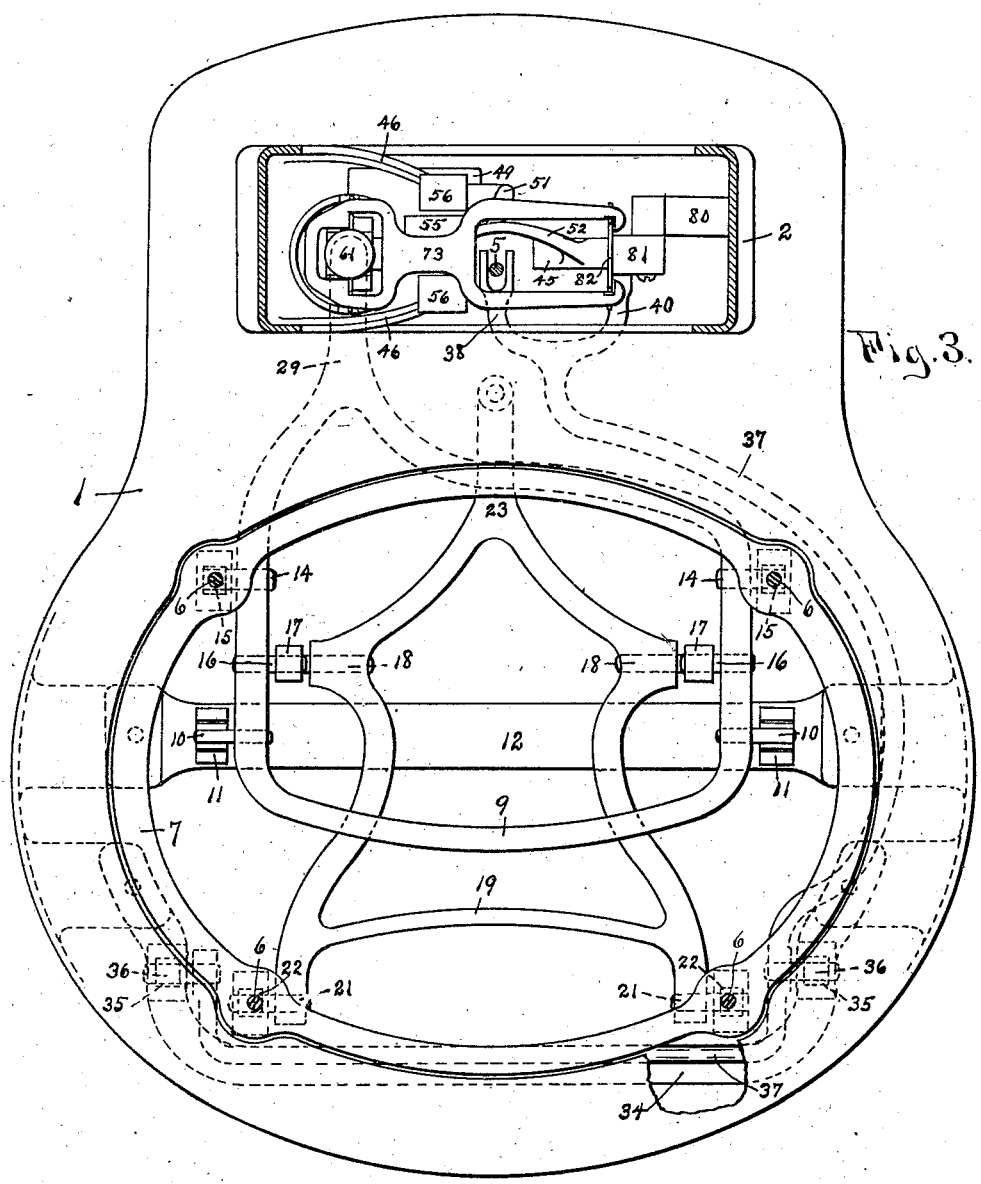

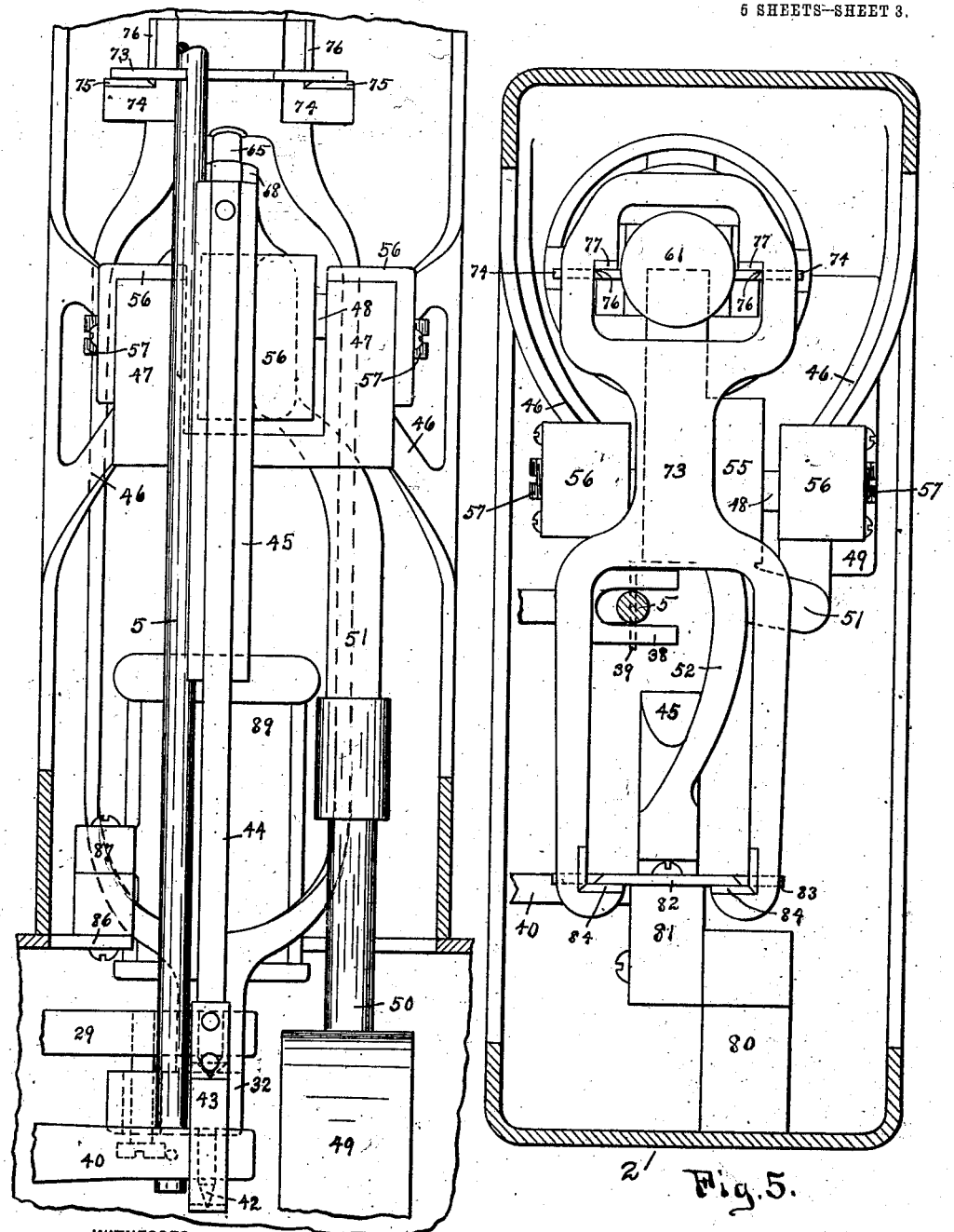

L. JAENICHEN.
PENDULUM SCALE.
APPLICATION FILED FEB. 26, 1914.
1,116,590.
Patented Nov. 10, 1914.
5 SHEETS—SHEET 4.
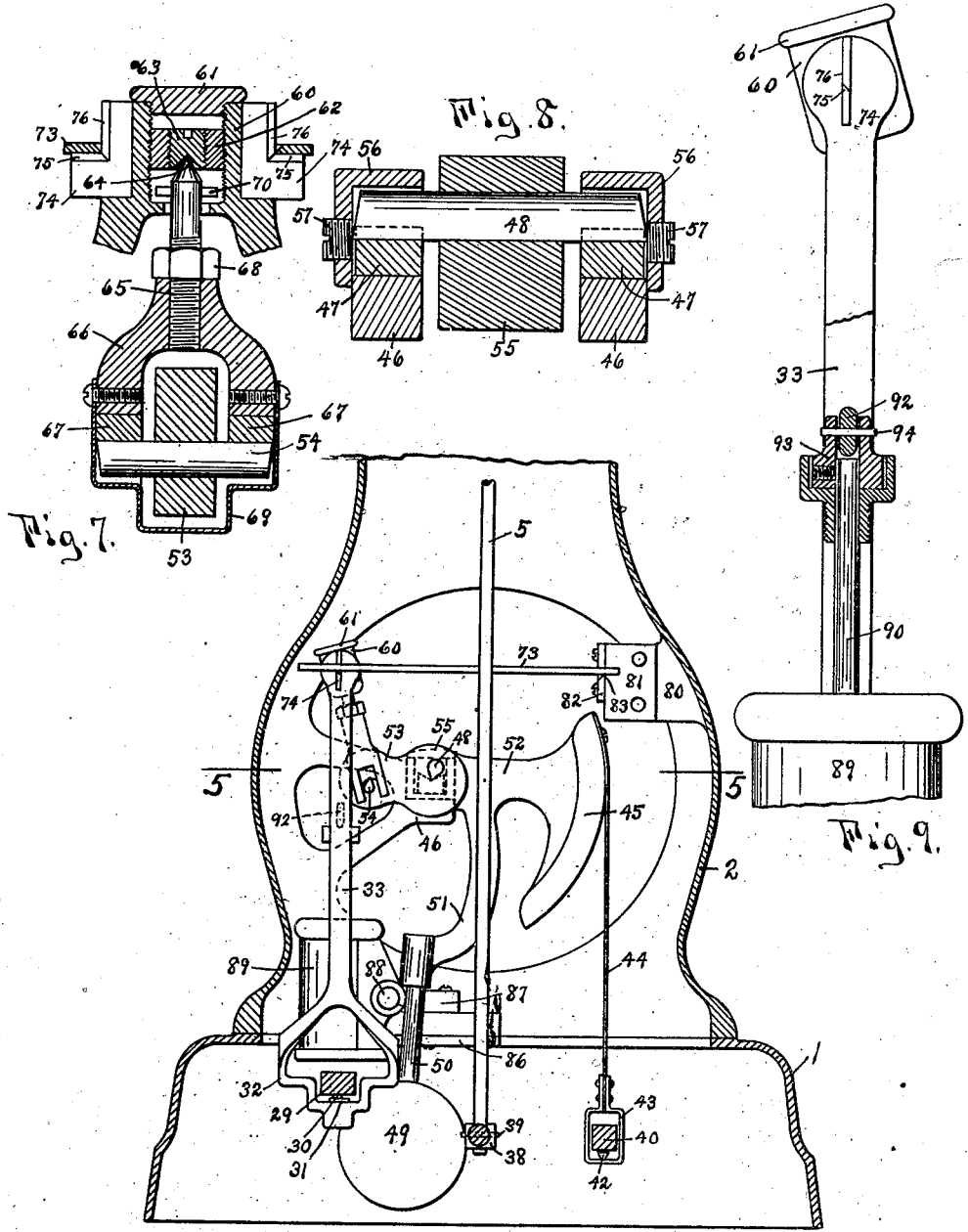

L. JAENICHEN.
PENDULUM SCALE.
APPLICATION FILED FEB. 26, 1914.

1,116,590.

Patented Nov. 10, 1914.
5 SHEETS—SHEET 5.

WITNESSES:
L. S. Woodhull
Hugo W. Kreinbring

INVENTOR
Louis Jaenichen
BY
Edward N. Pagelsen,
ATTORNEY

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN, A LIMITED PARTNERSHIP OF MICHIGAN.

PENDULUM-SCALE.

1,116,590.

Specification of Letters Patent.  Patented Nov. 10, 1914.

Application filed February 26, 1914. Serial No. 821,156.

*To all whom it may concern:*

Be it known that I, LOUIS JAENICHEN, a citizen of the United States, and a resident of Detroit, in the county of Wayne and State of Michigan, have invented a new and Improved Pendulum-Scale, of which the following is a specification.

This invention relates to scales in which the weight and value of the article on the platform is indicated by figures on a drum, and in which the stress of the load is resisted by a pendulum, and its object is to provide a connection between the weighing levers, pendulum and weight indicator, whereby the indicator is caused to move equal distances for equal increments in load on the platform.

This invention consists, in combination with the scale levers and pendulum, of an antifriction connection between them, of a weight indicator, a novel equalizing link pivoted at one end and connected to the indicator at its free end, a segment connected to the indicator and mounted on the axis of the pendulum, and a flexible connector between the equalizing link and said segment.

Figure 11:
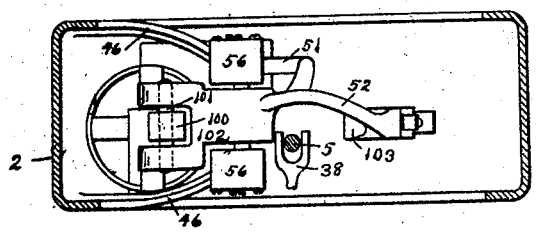
Figure 10:
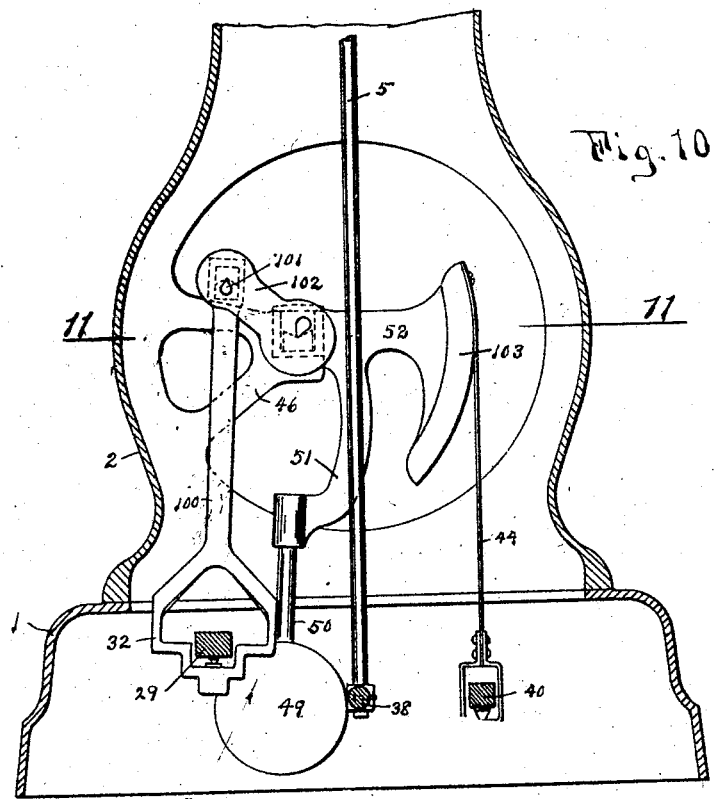

In the accompanying drawings, Figure 1 is an elevation of a scale embodying this present invention. Fig. 2 is a similar view on a larger scale with the side of the base broken away. Fig. 3 is a plan of the base and scale levers. Fig. 4 is an elevation of the mechanism in the lower end of the pedestal on a larger scale. Fig. 5 is a section of the pedestal on the line 5—5 of Fig. 6, on a larger scale, the mechanism within the pedestal being shown in plan. Fig. 6 is a front elevation of the connecting mechanism between the scale levers, pendulum and weight indicator, the front of the pedestal and one pendulum bearing being broken away. Fig. 7 is a section showing a portion of the connection between the main lever and pendulum. Fig. 8 is a section of the pivot of the pendulum. Fig. 9 is a detail of the connection between the main lever and the dash pot. Fig. 10 is an elevation of a modified form of connection between the main lever, weight indicator and pendulum. Fig. 11 is a section on line 11—11 of Fig. 10.

Similar reference characters refer to like parts throughout the several views.

The scale shown in the drawings is very similar in general appearance to many scales now on the market, and has a base 1, pedestal 2, case 3 for the weight indicator, and platform 4. The usual indicating drum may be actuated by the vertical rod 5. Rods 6 extend down from the platform to the supporting spider 7 within the base 1, which spider may be a substantially oval ring, as shown in Fig. 3.

The main lever 9 has knife-edges 10 resting in the bearings 11 carried by a bar 12 extending across the base and supported thereby. The main lever has also the knife-edges 14 which support the rear bearings 15 of the spider, and the knife-edges 16 on which hang the links 17 which receive and carry the knife-edges 18 of the secondary lever 19.

The secondary lever has knife-edges 21 at its front end on which rest the front bearings 22 of the spider 7. The rear end of the secondary lever is in the form of an arm 23 provided with a conical pivot 24 on which rests a post 25 having a pivot 26 at its upper end that rests in a cup 27 mounted on the base. This post receives the upward thrust of the front end of the secondary lever and swings on its pivot to accommodate for the endwise movement of the pivot 24.

The rear end of the main lever is also in the form of an arm 29, provided with a downwardly extending conical pivot 30, that bears in a cup 31 carried by the stirrup 32 at the lower end of the pitman 33.

A rigid bar 34 extends around within the front of the base, as shown in Figs. 2 and 3, and carries the two bearings 35 which support the two knife-edges 36 of the link 37. By having two bearings, the link is prevented from swinging laterally. The rear end of the link is bifurcated, one arm 38 connecting to the indicator rod 5 by means of a pivot pin 39, and the other arm 40 being provided with a conical pivot 42 that engages the stirrup 43 on the lower end of the flexible metallic ribbon 44 that connects to and rests against the segment 45, as shown in Fig. 6.

The pedestal may be formed with transverse arms 46 which carry the bearings 47, in which rests the knife-edge 48 which is the pivot of the pendulum. The pendulum consists of a weight 49 on a rod 50 carried by an arm 51, of a segment 45 on the arm 52, and an arm 53 that carries the knife-edges 54, all the arms uniting at a hub 55, in which is mounted the knife-edges 48 that support the pendulum. Caps 56 may be secured to the arms 46, and be provided with screws 57 which prevent endwise movement of the knife-edge 48.

The connection between the knife-edges 54 and the pitman 33, is the following. See Fig. 7. The pitman terminates in a socket 60 having a cap 61 and an adjustable plug 62, which has a hard center 63 provided with a conical depression to receive the sharp end 64 of the pin 65. A forked yoke 66 carries this pin and also the bearings 67 that engage the knife-edges 54. A nut 68 may be employed to adjust the pin 65, while the cap 69 may protect the bearings and prevent endwise movement on the knife-edges. A pin 70 may extend through the upper end of the pin 65 to prevent disengagement.

In order to guide the upper end of the pin 65, a link 73 is employed. A thin steel plate 74 extends from each side of the socket 60 and these plates have horizontal edges 75 in line with the point of the pin 65, and vertical edges 76 that meet these horizontal edges. The link 73 is formed with transverse edges 77, as shown in Figs. 5 and 7, that meet the edges 75 and 76 on a line with this point of the pin 65. This construction avoids all but the minimum of friction.

A bracket 80 projects from the right side of the pedestal and supports a block 81 to which a plate 82 is secured. This plate has horizontal edges 83 on which the link 73 rests, which link has horizontal transverse edges 84 that engage the outside face of the plate 82 along substantially the line of the edges 83 of the plate 82. By reason of this construction, friction is substantially eliminated, while the upper end of the compression member between the pitman and the pendulum is caused to travel a predetermined path.

On a plate 86 of the base (Fig. 4) is mounted a bearing 87 for the trunnion 88 of the dash-pot 89 of any desired construction. The piston rod 90 may connect to the pitman 33 by means of a cross bar 92 extending between the sides of the pitman. A head 93 may be secured to the piston rod and may be connected to the cross bar by means of a small pin 94. By suitably proportioning the pitman 33, arm 53, the compression member between them, the pendulum, the arm 52 and segment 45, and obtaining a long link 37, the rod 5 will be caused to move through practically even distances for equal increments of load placed on the platform.

In the construction shown in Figs. 10 and 11, the rear end 29 of the lever connects to the stirrup 32 as before, but the pitman 100 connects at its upper end directly to the pivot 101 on the bifurcated arm 102. The curved member 103 can no longer be a segment but must be in the form of a cam on which the connecting tape 44 winds as before described.

I claim:

1. In a scale, the combination of a base, main and secondary levers pivotally mounted thereon, a pedestal extending upward from the base and provided with inwardly extending arms, a knife-edge pivot resting on the arms, a plurality of arms mounted on the knife-edge, a pendulum connected to one of said arms, a pivot mounted on a second arm, a pitman connected to one end of the main lever to receive the stress communicated by the load, a compression member extending between the upper end of the pitman and the pivot on said second arm, a segment connected to the third arm, a flexible tape attached to the segment, a link pivoted at the front end of the platform and having its rear end connected to said tape, and an indicator operating rod connected to said rear end of the link.

2. In a scale, the combination of a base, a load sustaining lever pivoted thereon, a pitman extending upward from the rear end of said lever, a pendulum and a support therefor, an arm connected to the pendulum, a compression member having pivotal connection with the arm and the upper end of the pitman, means to guide the upper end of said pitman, a segment connected to the pendulum, an indicator actuating rod, and a flexible connector between said segment and said rod.

3. In a scale, the combination of a base, a load sustaining lever mounted thereon, a pitman extending upward from the rear end of said lever, a pendulum and a support therefor, an arm extending from said pendulum, a compression member having pivotal connection with said arm and pitman, means for controlling the path of the point of contact between the compression member and pitman, a segment connected to said pendulum, a metal tape connected thereto, an upright indicator-operating rod, and means to connect the lower ends of the tape and rod and control their movements.

4. In a scale, the combination of a base, a load sustaining lever mounted thereon, a pitman extending upward from the rear end of said lever, a pendulum and support therefor, an arm extending from said pendulum, a compression member having pivotal connection with said arm and pitman, means for controlling the path of the point of contact between the compression member and pitman, a segment connected to said pendulum, a metal tape connected thereto, an upright indicator-operating rod, and a link pivoted at the front end of the base and connecting to the lower ends of the tape and rod.

5. In a scale, the combination of a base, a load sustaining lever pivoted thereon, a pitman extending upward from the rear end of the lever, a pendulum and a support therefor, an arm connected to the pendulum, a compression member having pivotal connection with the arm and the upper end of the pitman, means to guide the upper end of the pitman, a segment connected to the pendulum, an indicator actuating rod, a link pivoted at one end at the front end of the base and at the rear end to said rod, and a flexible connector between the link and the segment.

6. In a scale, the combination of a base, main and secondary levers pivotally mounted thereon, a pedestal extending upward from the base and provided with inwardly extending arms, a knife-edge pivot resting on the arms, a plurality of arms mounted on the knife-edge, a pendulum connected to one of said arms, a pivot mounted on a second arm, a pitman connected to one end of the main lever to receive the stress communicated by the load, a compression member extending between the upper end of the pitman and the pivot on said second arm, means to guide the point of connection between the pitman and the compression member, a segment connected to the third arm, a flexible tape attached to the segment, a link pivoted at the front end of the platform and having its rear end connected to said tape, and an indicator operating rod connected to said rear end of the link.

7. In a scale, the combination of a base, a load sustaining lever pivoted thereon, a pedestal extending upward from the base, pivot bearings mounted thereon, a pendulum mounted on the bearings, an arm connected to the pendulum, a pitman extending upward from the rear end of the lever, a compression member having pivotal connection with the arm and the upper end of the pitman, a guiding link pivotally connected to the pedestal and to the upper end of the pitman, a segment connected to the pendulum, an indicator actuating rod extending vertically adjacent the segment, a guiding link pivoted at one end at the front of the base and at its rear end to said rod, and a flexible connector between the link and the segment.

8. In a scale, the combination of a base, a load sustaining lever and a load resisting pendulum, operative connections between the lever and pendulum, a segment connected to the pendulum, an indicator actuating rod extending vertically adjacent the segment, a guiding link pivoted at the front end of the base and at its rear end to said rod, and a flexible connector between the link and the segment.

9. In a scale, the combination of a base, a load sustaining lever and load resisting pendulum, operative connections between the lever and pendulum, an arm connected to the pendulum and having a curved end, an indicator actuating rod, a guiding link pivoted on the base and to said rod, and a flexible connector between the link and the curved end of the arm on the pendulum.

10. In a scale, the combination of a base, a load sustaining lever and a load resisting pendulum, operative connections between the lever and pendulum, a segment connected to the pendulum, an indicator actuating rod, a guiding link pivoted at the front end of the base and at its rear end to said rod, and a flexible connector between the link and the segment.

11. In a scale, the combination of a base, a load receiving member mounted thereon, a load resisting pendulum, means connecting the load receiving member and the pendulum, an indicator actuating rod, a guiding link pivoted at one end to the base and at the other end to the rod, and connecting means between the link and pendulum.

12. In a scale, the combination of a base, a load-sustaining lever and a load-resisting pendulum, operative connections between the pendulum and lever, an indicator-actuating rod, a segment connected to the pendulum, a flexible connector in engagement with the segment, and means whereby the free end of the flexible connector may be linked to the indicator-actuating rod.

In testimony whereof, I have signed this application in the presence of two subscribing witnesses.

LOUIS JAENICHEN.

Witnesses:
EDWARD N. PAGELSEN,
L. M. SPENCER.